United States Patent
Fujishima

(10) Patent No.: US 11,909,075 B2
(45) Date of Patent: Feb. 20, 2024

(54) PLUG ATTACHING DEVICE, AND SECONDARY BATTERY MANUFACTURING METHOD USING THE SAME

(71) Applicant: Prime Planet Energy & Solutions, Inc., Tokyo (JP)

(72) Inventor: Seigo Fujishima, Miyoshi (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 0 days.

(21) Appl. No.: 17/745,878

(22) Filed: May 17, 2022

(65) Prior Publication Data

US 2022/0376370 A1    Nov. 24, 2022

(30) Foreign Application Priority Data

May 19, 2021    (JP) ................................. 2021-084579

(51) Int. Cl.
| | |
|---|---|
| *H01M 50/645* | (2021.01) |
| *H01M 50/664* | (2021.01) |
| *H01M 50/102* | (2021.01) |
| *H01M 10/058* | (2010.01) |

(52) U.S. Cl.
CPC ....... *H01M 50/645* (2021.01); *H01M 10/058* (2013.01); *H01M 50/102* (2021.01); *H01M 50/664* (2021.01)

(58) Field of Classification Search
CPC ............. H01M 50/645; H01M 50/102; H01M 50/664; H01M 10/058
See application file for complete search history.

(56) References Cited

U.S. PATENT DOCUMENTS

| | | | | |
|---|---|---|---|---|
| 5,776,632 | A * | 7/1998 | Honegger | ........... H01M 50/627 429/185 |
| 2008/0011373 | A1* | 1/2008 | Zelson | .................. F16K 15/144 137/859 |
| 2008/0111373 | A1 | 5/2008 | Hersant et al. | |

(Continued)

FOREIGN PATENT DOCUMENTS

| | | |
|---|---|---|
| CN | 101542138 A | 9/2009 |
| CN | 104604016 A | 5/2015 |

(Continued)

OTHER PUBLICATIONS

JPO decision to grant a patent (Year: 2023).*

*Primary Examiner* — Alexander Usyatinsky
(74) *Attorney, Agent, or Firm* — HAUPTMAN HAM, LLP

(57) ABSTRACT

A technology capable of sealing a target with higher airtightness is provided. The plug attaching device disclosed herein is for attaching, to a through hole of a target, a cylindrical plug having therein a non-through hole that has an opening in one end surface. The device includes an insertion pin, and a guide portion. The guide portion is slidable in the axial direction of the insertion pin. This device is configured such that the plug is disposed inside the through hole, the insertion pin is pushed into the non-through hole with the guide portion disposed on the periphery of the opening to attach the plug into the through hole, and after the attachment, the insertion pin is moved in an opposite direction to the non-through hole to remove the insertion pin from the non-through hole, and the guide portion is then detached from the opening.

15 Claims, 7 Drawing Sheets

(56) References Cited

U.S. PATENT DOCUMENTS

2010/0101375 A1* 4/2010 Yoshida ................ B29C 73/166
                                                                    81/15.6
2010/0224281 A1* 9/2010 Yoshida ................ B29C 73/166
                                                                    141/38
2015/0207173 A1* 7/2015 Onizuka ........... H01M 10/0413
                                                                    29/623.5

FOREIGN PATENT DOCUMENTS

| JP | 11189252 | * | 10/1998 |
| JP | H11-189252 A | | 7/1999 |
| JP | 2014-049253 A | | 3/2014 |
| JP | 2020-191208 A | | 11/2020 |
| JP | 20200191208 | * | 11/2020 |

* cited by examiner

PLUG ATTACHING DEVICE, AND SECONDARY BATTERY MANUFACTURING METHOD USING THE SAME

CROSS REFERENCE TO RELATED APPLICATIONS

The present application is based upon and claims the benefit of priority from Japanese patent application No. 2021-084579 filed on May 19, 2021, and the entire disclosure of which is incorporated herein in its entirety by reference.

BACKGROUND OF THE DISCLOSURE

1. Technical Field

The present invention relates to a plug attaching device, and a secondary battery manufacturing method using the same.

2. Background

A plug may be attached into a through hole in a target to seal the inside of the target from outside. For example, Japanese Patent Application Publication No. H11-189252 describes attaching and detaching a plug to an opening of a workpiece (target) by using first and second jigs. This plug has a cylindrical plug body, a stopper for regulating an insertion position into the opening, and a hole formed from the vicinity of the stopper to the middle of the plug body. In order to attach the plug, part of the first jig is inserted into the hole, and the plug is pushed into the opening until it reaches the stopper position. Here, the other part of the first jig, which is different from the part inserted into the hole, comes into contact with the stopper, whereby the stopper is pushed against the surface of the workpiece. Thus, deformation of the stopper can be substantially prevented. In order to detach the plug, the second jig is inserted into the hole of the plug which has been attached and pushed in the insertion direction, whereby the stopper is deformed, and the plug is detached from the opening. Japanese Patent Application Publication No. H11-189252 indicates that according to such a technology, the plug can be attached to or detached from the workpiece easily and promptly.

SUMMARY OF THE INVENTION

There has been still room for improvement in the technology disclosed in Japanese Patent Application Publication No. H11-189252. Attachment of the plug body in Japanese Patent Application Publication No. H11-189252 is completed when the stopper comes into contact with the surface of the workpiece. At this time, the first jig is removed from the hole of plug body, but the plug body may come off the opening of the workpiece together with the first jig. This is undesirable because it reduces the airtightness of the target to be sealed with the plug.

The present disclosure was made in view of the problems, and intended to provide a technology capable of sealing the target with higher airtightness.

The plug attaching device disclosed herein is a device for attaching, to a through hole of a target, a cylindrical plug having therein a non-through hole that has an opening on one end surface. The device includes an insertion pin to be inserted into the non-through hole from the opening of the plug, and a guide portion for guiding a peripheral wall surface of the insertion pin, the guide portion being slidable in an axial direction of the insertion pin. The device is configured such that the plug is disposed inside the through hole, the insertion pin is pushed into the non-through hole with the guide portion disposed on a periphery of the opening, to attach the plug into the through hole, and after the attachment, the insertion pin is moved in an opposite direction to the non-through hole to remove the insertion pin from the non-through hole, and the guide portion is then detached from the opening.

The plug attachment device with this configuration includes an insertion pin to be inserted into the hole of the plug. The insertion pin allows the plug to be attached into the through hole of the target easily. The plug attachment device further includes a guide portion for guiding the peripheral wall surface of the insertion pin. The guide portion allows the insertion pin to be inserted into the hole more reliably. Further, after the attachment of the plug, the guide portion is detached from the opening after removing the insertion pin from the hole. This substantially prevents the attached plug from coming off the through hole with movement of the insertion pin, and can enhance airtightness of the target.

In a preferred aspect of the plug attachment device disclosed herein, the insertion pin coaxially has a columnar large-diameter portion and a columnar small-diameter portion having a diameter smaller than the large-diameter portion, the small-diameter portion protrudes from an end of the large-diameter portion in the axial direction, the large-diameter portion is slidable in the axial direction along inner wall surface of the non-through hole, and the device is configured such that the plug is attached into the through hole with at least part of the large-diameter portion and the small-diameter portion inserted into the non-through hole and an end of the small-diameter portion in the insertion direction in contact with at least part of a bottom surface of the non-through hole. With this configuration, the suitable automation of the attachment of the plug into the through hole of the target can be achieved in addition to the above effects.

In another preferred aspect of the plug attachment device disclosed herein, the plug includes a plug body to be fitted into the through hole of the target, and a restriction portion for restricting fitting of the plug into the through hole, the plug body and the restriction portion are continuous to each other, the opening of the non-through hole is formed in an outer surface on the restriction portion side in the direction in which the plug body and the restriction portion are continuous to each other, the non-through hole extends from the opening to the inside of the plug body through the restriction portion, and the bottom surface of the non-through hole is formed inside the plug body. By the use of the plug with such a configuration, substantial prevention of the plug from falling into the inside of target can be achieved in addition to the above effects.

The present inventors focused more specifically on the manufacturing of secondary batteries. Specifically, according to the technology disclosed herein, provided is a method for manufacturing a secondary battery including an electrode assembly that includes a positive electrode and a negative electrode, a nonaqueous electrolyte, and a battery case having a liquid injection hole for injecting the nonaqueous electrolyte, the battery case housing the electrode assembly and the nonaqueous electrolyte. The secondary battery manufacturing method includes temporary sealing the liquid injection hole of the battery case housing the electrode assembly and the nonaqueous electrolyte, and the temporary sealing is performed by using the plug attaching device. With this configuration, a higher airtightness of temporary sealing can be achieved. Therefore, manufacturing equipment for secondary batteries can be partially omitted, and secondary batteries can be manufactured at a lower cost.

DETAILED DESCRIPTION OF THE PREFERRED EMBODIMENTS

Figure 1:
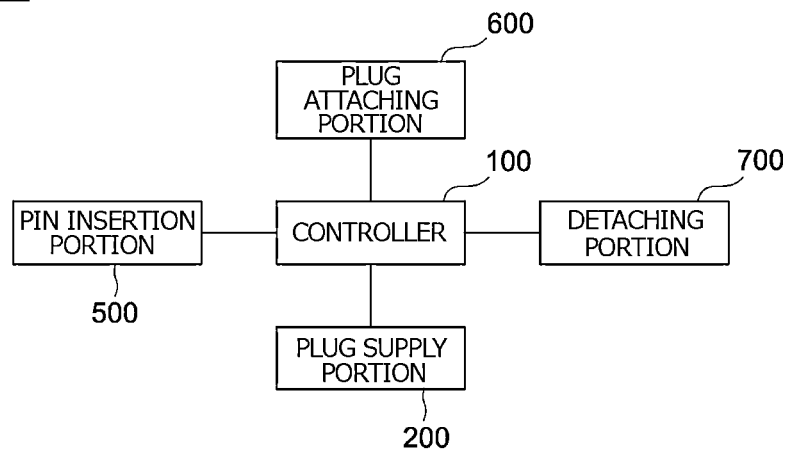
FIG. 1 is a block diagram illustrating a configuration of a plug attaching device according to an embodiment.

Some preferred embodiments of the technology disclosed herein will be described below with reference to the accompanying drawings. The matters necessary for executing the technology disclosed herein, except for matters specifically herein referred to can be grasped as design matters of those skilled in the art based on the related art in the preset field. The present disclosure can be executed based on the contents disclosed herein and the technical knowledge in the present field. In the drawings, the same members/portions which exhibit the same action are denoted by the same reference numeral.

The "secondary battery" herein is a term that indicates all electricity storage devices that can be repeatedly charged and discharged, and is a concept that encompasses so-called secondary batteries (chemical batteries) such as a lithium ion secondary battery and capacitors (physical batteries) such as an electric double layer capacitor. The meaning of the expression "A to B" (A and B are any numerical values) indicating herein a numerical range encompasses "A or more and B or less" and "more than A and less than B."

The plug attaching device disclosed herein is a device for attaching into a through hole of a target a cylindrical plug having therein a non-penetrating recess (a non-through hole) that has an opening on one end surface. As shown in FIG. 1, the plug attaching device 1000 includes a controller 100 as a functional block, a plug supply portion 200, a pin insertion portion 500, a plug attaching portion 600, and a detaching portion 700. The plug attaching device 1000 further includes an insertion pin 300 and a guide portion 400 (see FIG. 3). The controller 100 controls a series of operations of the plug attaching device 1000 (e.g., insertion of the insertion pin into the plug, attachment of the plug to the target, detachment of the insertion pin from the plug, detachment of the guide portion, and the like). The controller 100 includes a CPU that executes a processing program, a ROM storing the processing program, a RAM temporally storing data, an input/output port, and a communication port. The general configuration of the controller 100 may be similar to that of known controller of this type, and do not define the technology disclosed herein; thus, the detailed description thereof is omitted.

Figure 2:
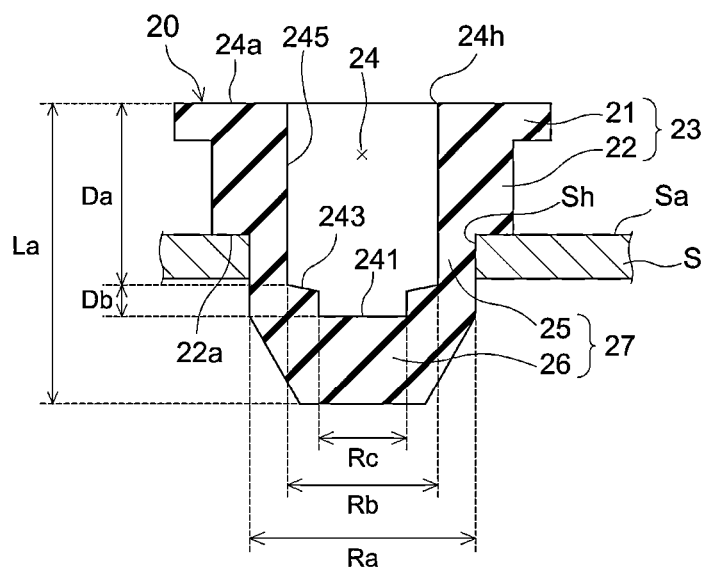
FIG. 2 is a cross-sectional view of a state where a plug is attached to a through hole of a target by using a plug attaching device according to an embodiment.

The plug supply portion 200 supplies a plug to be attached to the target. The plug supply portion 200 is linked to a storage (not shown) storing plugs. As shown in FIG. 2, the plug 20 is a cylindrical plug, and includes a plug body 27 to be fitted into a through hole Sh of a target S, and a restriction portion 23 for restricting fitting of the plug 20 into the through hole Sh. The plug body 27 (specifically, a sealing portion 25 to be described later) and the restriction portion 23 (specifically, a cylinder 22 to be described later) are continuous to each other, whereby the restriction portion 23 and the plug body 27 are integral with each other to configure the plug 20.

As shown in FIG. 2, the plug body 27 includes a cylindrical sealing portion 25 and a tapered portion 26 having a tapered cross section. The sealing portion 25 and the tapered portion 26 are continuous to each other in the axial direction of the plug 20. The outer diameter Ra of the sealing portion 25 is set to be larger enough to allow the sealing portion 25 to be pushed (press-fitted) into the through hole Sh. Although not particularly limited thereto, the ratio (Ra/Rs) of the outer diameter Ra of the sealing portion 25 to the diameter Rs of the through hole Sh can be 0.6 or more to 1.2 or less.

The restriction portion 23 includes a disk-shaped flange portion 21 and a cylindrical cylinder 22. The flange portion 21 and the cylinder 22 are continuous to each other in the axial direction of the plug 20. The restriction portion 23 has these two portions, whereby the plug 20 can be easily detached from the target S. Although not particularly limited thereto, the diameter of the flange portion 21 is larger than that of the cylinder 22 in the present embodiment. With this configuration, as mentioned below, the force with which the guide portion 400 pushes the flange portion 21 at the time when the plug 20 is attached into the through hole Sh can be absorbed by elastic deformation of the cylinder 22. This can substantially prevent deformation of the periphery of the through hole Sh of the target S.

The restriction portion 23 extends outward from the plug body 27. Specifically, as shown in FIG. 2, the diameter of the cylinder 22 is larger than the diameter Ra of the sealing portion 25. The side 22a of the cylinder 22 is in contact with the surface Sa of the target S. The diameter of the cylinder 22 is larger than the diameter Rs of the through hole Sh of the target S. Thus, the restriction portion 23 can prevent the entire plug 20 from passing through the through hole Sh. The diameter of the cylinder 22 is not particularly limited as long as being large enough to prevent the entire plug 20 from passing through the through hole Sh even at the time when the entire plug 20 is pushed thereinto.

The plug 20 has therein a non-through hole 24 with an opening 24h in its one end surface 24a. Specifically, as shown in FIG. 2, in the direction in which the plug body 27 and the restriction portion 23 are continuous to each other (i.e., in the axial direction of the plug 20), the opening 24h of the hole 24 is formed in the outer surface on the restriction portion 23 side. More specifically, inside the plug 20, an opening 24h reaching the outer surface (end surface 24a) of the plug 20 is formed on the restriction portion 23 side in the axial direction, and a hole 24 (cavity) not reaching the outer surface of the plug 20 is formed on the plug body 27 side in the axial direction. The hole 24 penetrates the flange portion 21 and the cylinder 22 from the opening 24h and reaches the inside of the plug body 27. Inside the plug body 27, a bottom surface 241 of the hole 24 is formed. In the present embodiment, a step 243 is provided between the inner wall surface 245 and the bottom surface 241 of the hole 24. The diameter Rc of the bottom surface 241 is smaller than the diameter Rb of the hole 24. Although not particularly limited thereto, the ratio (Rc/Rb) of the diameter Rc to the diameter Rb is, for example, 0.5 or more, may be set to less than 1 (e.g., 0.95 or less, 0.90 or less). This allows the tip of the insertion pin 300 which has been inserted into the hole 24 to be stably brought into contact with the bottom surface 241. Accordingly, displacement of the insertion pin 300 inside the hole 24 is substantially prevented, and the plug can be reliably attached into the through hole of the target.

The plug 20 is preferably an elastic body and made of a material having a chemical resistance to a nonaqueous electrolyte. The material of the plug 20 includes rubbers (or elastomers) such as a butyl rubber, a styrene-propylene rubber, an ethylene-propylene rubber (EPDM), a styrene-butadiene rubber, a nitril rubber, a fluorine rubber, and a natural rubber. In light of the chemical resistance, the material of the plug 20 used is preferably EPDM. The plug body 27 and the restriction portion 23 may be made of different materials, but it is preferred that at least the plug body 27 is formed of a rubber (e.g., EPDM).

Figure 3:
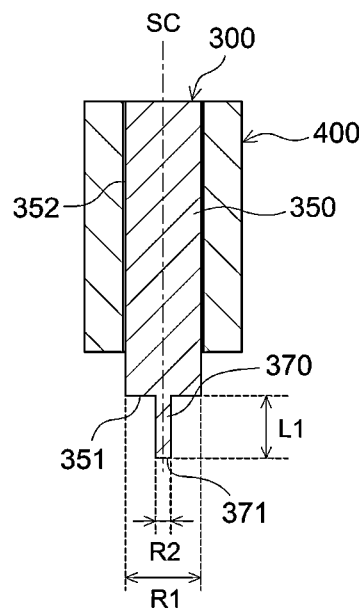
FIG. 3 is a cross-sectional view of structures of an insertion pin and a guide portion included in a plug attaching device according to an embodiment.

The insertion pin 300 is a pin to be inserted into the hole 24 from the opening 24h of the plug 20. As shown in FIG. 3, the insertion pin 300 coaxially (on the axial center SC in FIG. 3) has a columnar (cylindrical in FIG. 3) large-diameter portion 350 and a columnar (cylindrical in FIG. 3) small-diameter portion 370 having a diameter smaller than the large-diameter portion 350. The small-diameter portion 370 protrudes from an end 351 in the axial direction of the large-diameter portion 350. The small-diameter portion 370 provided allows the plug 20 to be attached into the through hole Sh of the target S more reliably (see FIG. 2), and allows improvement in airtightness of the target after the plug is attached.

The large-diameter portion 350 is configured to be slidable in the axial direction of the insertion pin 300 along an inner wall surface 245 (see FIG. 2) of the hole 24. Specifically, the ratio (R1/Rb) of the diameter R1 of the large-diameter portion 350 to the diameter Rb of the hole 24 may be less than 1. The ratio (R1/Rb) may be 0.98 or less, or 0.96 or less. The diameter R1 is preferably large enough to allow the large-diameter portion 350 to move with being inserted into the hole 24 while holding the plug 20. The ratio (R1/Rb) may be 0.70 or more, 0.75 or more, or 0.80 or more.

When the insertion pin 300 is inserted into the hole 24, there is preferably a gap between the small-diameter portion 370 and the inner wall surface 245 of the hole 24. This makes it easier for the plug 20 to be deformed elastically when the plug 20 is attached into the through hole Sh of the target S. Accordingly, the load applied to the inner wall surface of the through hole Sh can be reduced, and deformation of the periphery of the through hole Sh can be substantially prevented. Further, damage such as scratching to the plug 20 is substantially prevented. This can facilitate the reuse of the plug 20. Specifically, for example, the ratio (R2/R1) of the diameter R1 of the large-diameter portion 350 to the diameter R2 of the small-diameter portion 370 may be set to be less than 1. The ratio can be, for example, 0.9 or less, preferably 0.7 or less, more preferably 0.6 or less.

In order to reliably attach the plug 20 into the through hole Sh, the ratio (R2/R1) is preferably 0.2 or more, more preferably 0.4 or more. In light of the same, the diameter R2 of the small-diameter portion 370 is smaller than the diameter Rc of the bottom surface 241 of the hole 24, and may be, for example, 4/5 Rc or less. The diameter R2 may be 1/8 Rc or more, 1/5 Rc or more, or 1/3 Rc or more. Alternatively, when the depth of the hole 24 is 1, the height (the length in the axial direction) of the small-diameter portion 370 may be 0.2 or more, 0.3 or more, or 0.4 or more, and 0.9 or less, 0.8 or less, or 0.7 or less.

The guide portion 400 is configured to guide the peripheral wall surface 352 of the insertion pin 300, and to be slidable in the axial direction of the insertion pin 300. The guide portion 400 has a cylindrical shape, and the large-diameter portion 350 of the insertion pin 300 is disposed inside the guide portion 400 when the plug attaching device 1000 is operated. The inner diameter of the guide portion 400 is not particularly limited as long as the large-diameter portion 350 which has been disposed therein can be slid smoothly, and can be changed, as appropriate, according to the diameter R1 of the large-diameter portion 350.

Figure 4:
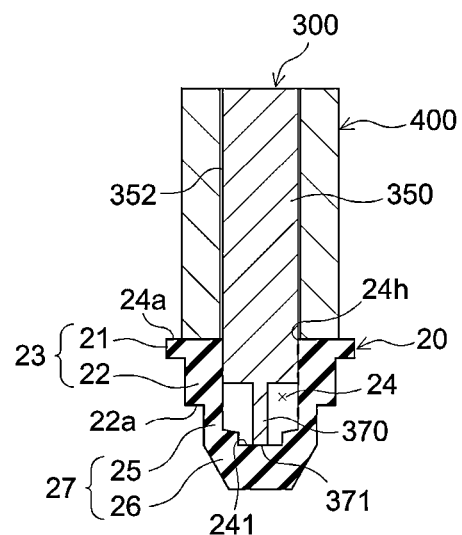
FIG. 4 is a cross-sectional view illustrating an operation of a plug attaching device according to an embodiment.

The pin insertion portion 500 is a portion where the insertion pin 300 is inserted into the hole 24 of the plug 20 to form a combination of the insertion pin 300 and the plug 20. The plug attaching portion 600 is a portion where the plug 20 is attached into the through hole Sh of the target S. The detaching portion 700 is a portion where the insertion pin 300 and the guide portion 400 are detached from the hole 24 of the plug 20 that has been attached into the through hole Sh of the target S. The cross-sectional views shown in FIGS. 3 to 8 are used below to describe an example of the operation of the plug attaching device 1000 by the controller 100 in more detail. First, as shown in FIG. 3 and FIG. 4, in the pin insertion portion 500, the insertion pin 300 is disposed inside the guide portion 400, so that the insertion pin 300 is inserted into the hole 24 from the opening 24h of the plug 20 which has been supplied from the plug supply portion 200. Specifically, as shown in FIGS. 3 and 4, at least part of the large-diameter portion 350 of the insertion pin 300 and the small-diameter portion 370 are first inserted into the hole 24. Then, the guide portion 400 is disposed on the periphery of the opening 24h. At this time, the guide portion 400 comes into come into contact with the end surface 24a. Then, the end 371 of the small-diameter portion 370 is brought into contact with at least part of the bottom surface 241 of the hole 24.

Figure 5:
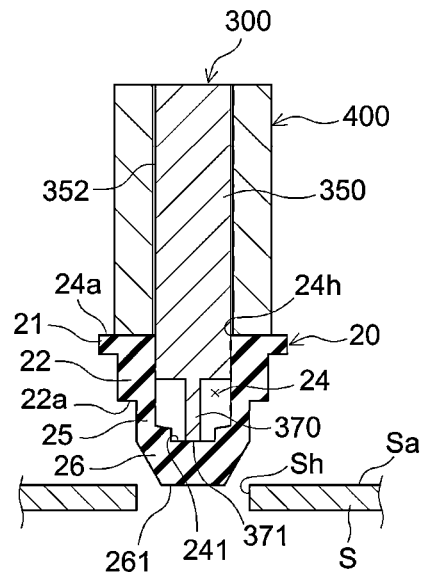
FIG. 5 is a cross-sectional view illustrating an operation of a plug attaching device according to another embodiment.
Figure 6:
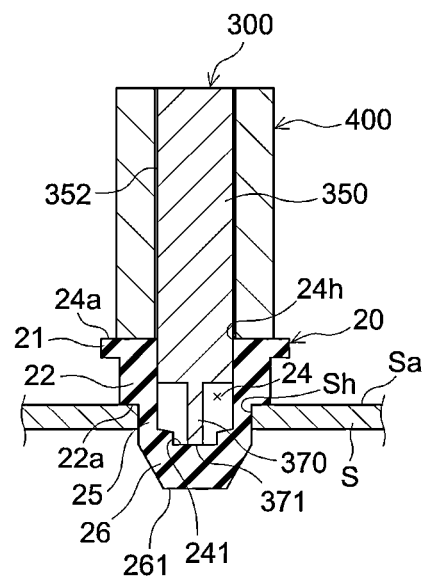
FIG. 6 is a cross-sectional view illustrating an operation of a plug attaching device according to another embodiment.

Subsequently, in the plug attaching portion 600, the plug 20 in this state is disposed in the through hole Sh. Specifically, as shown in FIG. 5, in the plug attaching portion 600, the position of the end surface 261 of the tapered portion 26, which is an attachment tip, of the plug 20 is aligned with the surface Sa of the periphery of the through hole Sh of the target S. Subsequently, with the guide portion 400 disposed on the periphery of the opening 24h as prepared above, the insertion pin 300 is slid so that the plug 20 which has been pushed into the hole 24 is fitted into the through hole Sh. At this time, the tapered portion 26 and sealing portion 25 of the plug body 27 are inserted into the through hole Sh in this order, and the sealing portion 25 is fitted into the inner wall surface of the through hole Sh. The insertion pin 300 is, as shown in FIG. 6, pushed into the hole 24 until the side 22a of the cylinder 22 comes into contact with the surface Sa of the target S. When the side 22a comes into contact with the surface Sa, the attachment of the plug 20 into the through hole Sh is completed.

Figure 7:
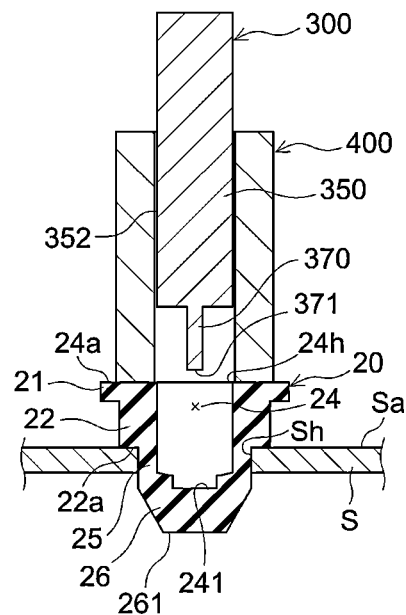
FIG. 7 is a cross-sectional view illustrating an operation of a plug attaching device according to another embodiment.
Figure 8:
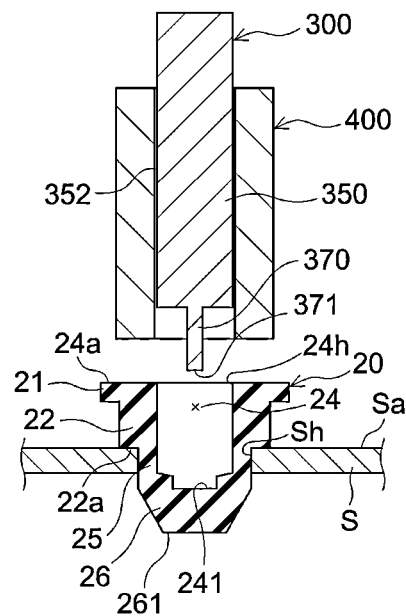
FIG. 8 is a cross-sectional view illustrating an operation of a plug attaching device according to another embodiment.

After the attachment, as shown in FIG. 7, in the detaching portion 700, the insertion pin 300 is moved (slid) in the opposite direction to the hole 24 (the opposite direction to the push-in direction) to detach the end 371 of the small-diameter portion 370 from the bottom surface 241. At this time, the guide portion 400 is being placed on the periphery of the opening 24h. Then, the detaching portion 700 causes the insertion pin 300 to be removed from the hole 24 with the movement. Thereafter, as shown in FIG. 8, in the detaching portion 700, the guide portion 400 is moved in the opposite direction to the hole 24 to detach the guide portion 400 from the opening 24h. Accordingly, the plug 20 is substantially prevented from coming off the through hole Sh.

Figure 9:
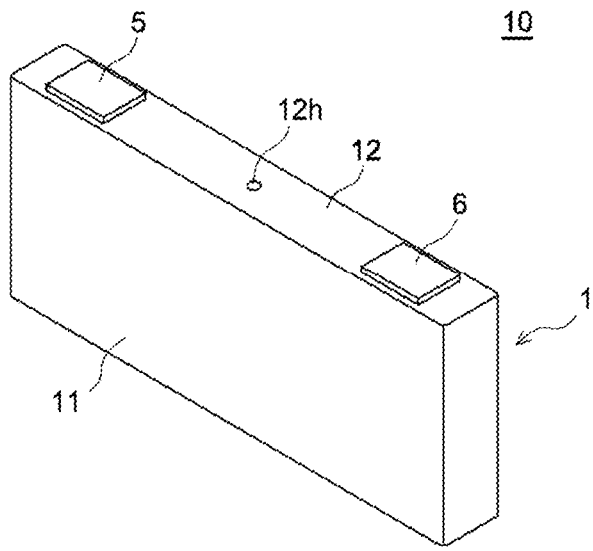
FIG. 9 is a schematic perspective view of a secondary battery manufactured by a secondary battery manufacturing method according to an embodiment.

The type of the target S to which the plug is attached by the plug attaching device 1000 is not particularly limited. The target S may be a container having therein a closed space by sealing of (i.e., plug attachment into) the through hole Sh. The target S may be, for example, a battery case of a secondary battery. Specifically, a secondary battery manufacturing method using the plug attaching device disclosed herein is provided. As shown in FIG. 9, a secondary battery 10 manufactured by the method includes: an electrode assembly (not shown), a nonaqueous electrolyte (not shown), and a battery case 1. The secondary battery 10 herein is a lithium ion secondary battery.

The battery case 1 includes a case body 11 having an opening, and a lid 12 closing the opening. The battery case 1 is integrated and airtightly sealed (hermetically sealed) by the lid 12 joined to the periphery of the opening of the case body 11. The lid 12 is provided with a liquid injection hole 12h, a safety valve (not shown), a positive electrode external terminal 5, and a negative electrode external terminal 6. The liquid injection hole 12h is a hole for injecting an electrolyte into the battery case 1, and is sealed with a sealing plug. The safety valve is configured to be broken and to discharge gas inside the case to the outside when the pressure inside the case exceeds a predetermined value. The positive electrode external terminal 5 and the negative electrode external terminal 6 are connected electrically to the electrode assembly housed in the battery case 1. The battery case 1 houses an electrolyte and a nonaqueous electrolyte. Examples of the metal material constituting the battery case 1 include aluminum, an aluminum alloy, iron, and an iron alloy. Alternatively, the battery case 1 may be made of a heat resistant resin material, such as a polyimide resin.

The electrode assembly is a power generation element for the secondary battery 10, and includes a positive electrode, a negative electrode, and a separator separating the positive electrode and the negative electrode. The material constituting the secondary battery 10 other than those described above (e.g., materials constituting the electrode assembly and the nonaqueous electrolyte) can be those which can be used in this type of secondary battery without particular limitations, and do not characterize the technology disclosed herein. Thus, the detailed description is omitted.

Figure 10:
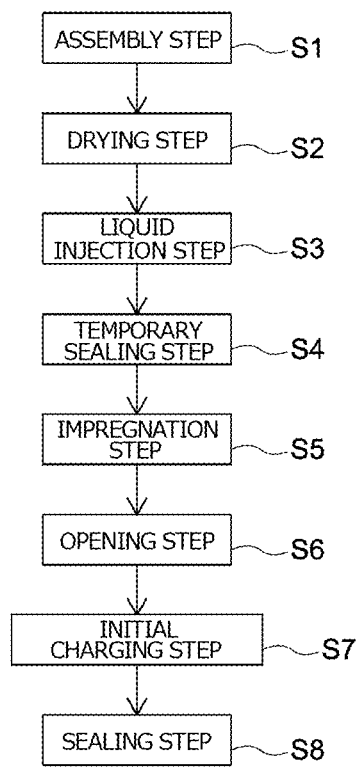
FIG. 10 is a diagram illustrating steps of a secondary battery manufacturing method according to an embodiment.

The secondary battery manufacturing method disclosed herein can include, as shown in FIG. 10, the following steps S1 to S8, namely an assembly step S1, a drying step S2, a liquid injection step S3, a temporary sealing step S4, an impregnation step S5, an opening step S6, an initial charging step S7, and a sealing step S8.

Figure 11:
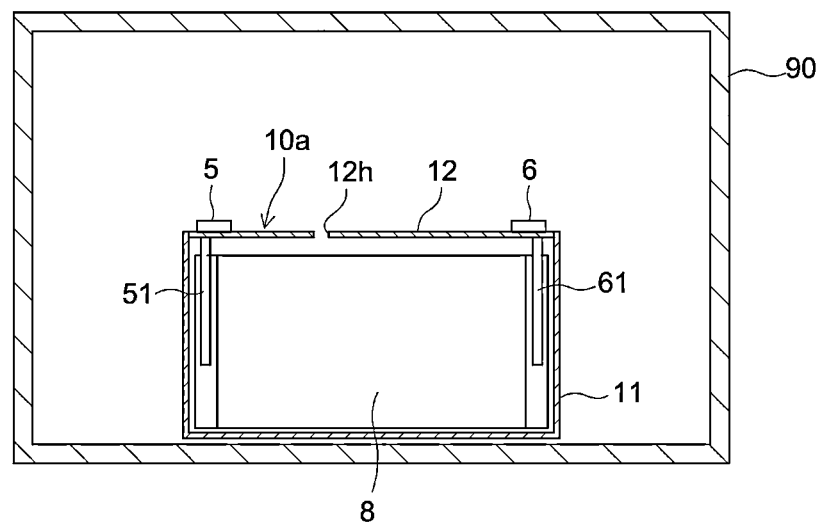
FIG. 11 is a schematic view of a step of a secondary battery manufacturing method of an embodiment.

In the assembly step S1, an electrode assembly is housed in a battery case. Specifically, for example, as shown in FIGS. 9 and 11, a positive electrode internal terminal 51 and a negative electrode internal terminal 61 are attached to an electrode assembly 8 produced by a known method. Then, the positive electrode internal terminal 51 and the negative electrode internal terminal 61 are joined to a positive electrode external terminal 5 and a negative electrode external terminal 6 which have been attached to a lid 12, respectively by a known method (e.g., ultrasonic joining, resistance welding, laser welding). Thereafter, the electrode assembly 8 is housed in a case body 11. In this state, the lid 12 is overlaid on the opening of the case body 11, which is then welded together. In this way, the case body 11 is sealed, and a battery assembly 10a is produced.

In the drying step S2, the inside of the battery assembly 10a is dried. For example, as shown in FIG. 11, the battery assembly 10a is placed in an airtight chamber 90, the temperature of air inside the airtight chamber 90 is then raised until it reaches a predetermined temperature and then maintained for a predetermined time (e.g., 10 minutes to 4 hours) after reaching the predetermined temperature. The temperature is not particularly limited as long as it is a temperature at which moisture inside the battery assembly 10a is sufficiently removed, but for example, set to 100° C. or more to 150° C. or less. A heating element (such as a plate heater) may be installed inside the airtight chamber 90.

In the liquid injection step S3, a nonaqueous electrolyte is injected into a battery case 1 via a liquid injection hole 12h (see FIGS. 9 and 11). As a method for injecting the nonaqueous electrolyte, known liquid injection methods can be used without particular limitations. As an example, the nonaqueous electrolyte is injected with the inside of the battery case 1 depressurized. In this case, first, the depressurization is performed so that the internal pressure of the battery case 1 reaches lower than atmospheric pressure. For example, the inside of the battery case 1 can be depressurized by making the airtight chamber 90 in depressurized atmosphere. Although not particularly limited thereto, the internal pressure of the battery case 1 after the depressurization may be, −0.05 MPa or less, −0.08 MPa or less, −0.09 MPa or less, with respect to the atmospheric pressure (0.1 MPa), and the lower the internal pressure, the better. In such a depressurized atmosphere, a predetermined amount of the nonaqueous electrolyte is injected into the battery case 1. Specifically, for example, a liquid injection pipe in connection to a supply source (e.g., a tank containing a nonaqueous electrolyte) for the nonaqueous electrolyte is connected to the liquid injection hole 12h, and the nonaqueous electrolyte is injected into the case body 11. Thereafter, the internal pressure of the battery case 1 is raised to atmospheric pressure. In this pressure rise, for example, dry air or inactive gas (such as nitrogen gas) is introduced into the airtight chamber 90.

In the temporary sealing step S4, the liquid injection hole 12h of the battery case 1 housing the electrode assembly 8 and the nonaqueous electrolyte is temporarily sealed. This temporary sealing is performed by using the plug attaching device disclosed herein. Specifically, a plug 20 with a structure shown in FIG. 2 is attached as a temporary sealing member (temporary sealing plug) to the liquid injection hole 12h (through hole) of the secondary battery 10 which is a target.

In the impregnation step S5, with the liquid injection hole 12h temporarily sealed, the electrode assembly 8 is impregnated with at least part of the nonaqueous electrolyte. As described above, the internal pressure of the battery case 1 has been raised to atmospheric pressure. Thus, the pressure inside the electrode assembly 8 is lower than the internal pressure of the battery case 1. The pressure difference causes the electrode assembly 8 to be impregnated with the non-aqueous electrolyte. In this step, for example, the secondary battery assembly is left for a predetermined time under atmospheric pressure and a predetermined temperature condition until the level of the nonaqueous electrolyte which has been injected in the battery case 1 drops to a predetermined level. The temperature condition is, for example, 20° C. to 30° C., and may be about room temperature (25° C.). The leave time depends on the size of the secondary battery to be manufactured, but may be 5 to 45 hours (approximately 20 to 30 hours).

As described above, in the secondary battery manufacturing method disclosed herein, the liquid injection hole 12h is temporarily sealed by using the plug attaching device after injection of the nonaqueous electrolyte. After the temporary sealing, high airtightness is achieved in the battery case 1. Thus, the impregnation step S5 can be conducted outside the airtight chamber 90. Alternatively, the impregnation step S5 can be conducted with the dry air or inactive gas (such as nitrogen gas) not introduced into the airtight chamber 90. In this way, manufacturing equipment for secondary batteries can be partially omitted by using the plug attaching device.

In the opening step S6, the temporary sealing member is removed to open the liquid injection hole 12h. Specifically, for example, the plug 20 which has been attached to the secondary battery assembly 10a is moved in the opposite direction to the liquid injection hole 12h to detach the plug 20 from the liquid injection hole 12h and open the liquid injection hole 12h. A function to detach the plug 20 may be imparted to the device, or another device (i.e., the plug detachment device) may be used. After the opening, the plug 20 may be collected and reused.

In the initial charging step S7, the secondary battery assembly 10a is charged with the liquid injection hole 12h open. The present step conducted allows gas to be generated, and this gas to be discharged outside the battery case 1. Further, a high-quality coating can be formed on the surface of the negative electrode active material layer. Charging conditions in the present step are not particularly limited and may be set as appropriate.

In the sealing step S8, the liquid injection hole 12h is sealed with a sealing member. As the sealing member, sealing members which have been used in this kind of secondary battery can be used without particular limitations. As an example, a metal sealing plug is used, and is fitted into the liquid injection hole 12h. Then, laser welding or the like is performed to seal the liquid injection hole 12h with the liquid injection hole 12h closed with this sealing plug. Thereafter, the secondary battery assembly 10a is charged and subjected to an aging process under predetermined conditions to obtain a secondary battery 10 that is ready for use.

EXAMPLES

Some test examples regarding the present invention will be described below, but are not intended that the present invention is limited to such test examples.

An aluminum battery case having a thickness of 1.4 mm and having a lid that has a circular liquid injection hole with a diameter of 5 mm was provided. Further, a temporary sealing member (temporary sealing plug) having the structure shown in FIG. 2 was provided. This temporary sealing plug had Ra=3.6 mm, Rb=2.4 mm, Re=2.0 mm, Da=5.3 mm, Db=0.2 mm, and La=7.6 mm. Note that La indicates the length from the end surface 24a to the end surface 261 (the height of the temporary sealing plug), Da indicates the length from the opening 24h to the step 243, Db indicates the length from the step 243 to the bottom surface 241.

Insertion pins of Examples 1 to 3 were provided.

Example 1

As an insertion pin of Example 1, an insertion pin 300 having a structure shown in FIG. 3 was provided. The configuration of the insertion pin 300 was as described above, and R1=2.8 mm, R2=1.4 mm, and L1=3.7 mm. The length L1 is a length of the small-diameter portion 370 in the axial direction.

Example 2

Figure 12:
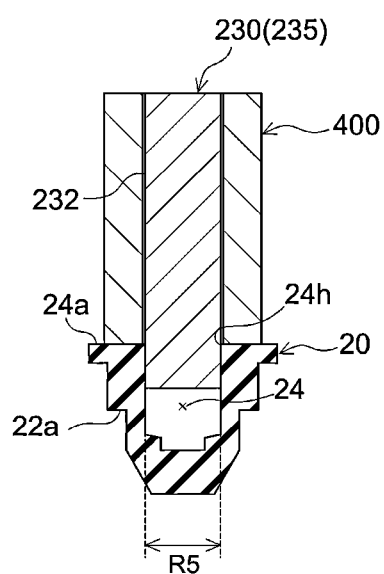
FIG. 12 is a cross-sectional view of a structure of a temporary sealing plug according to Test Example 2.

As an insertion pin of Example 2, an insertion pin 230 having a structure shown in FIG. 12 was provided. The insertion pin 230 had a large-diameter portion 235 and had no small-diameter portion. The large-diameter portion 235 had a diameter R5 of 2.8 mm. In FIG. 12, the reference numeral 232 indicates the peripheral wall surface of the insertion pin 230.

Example 3

Figure 13:
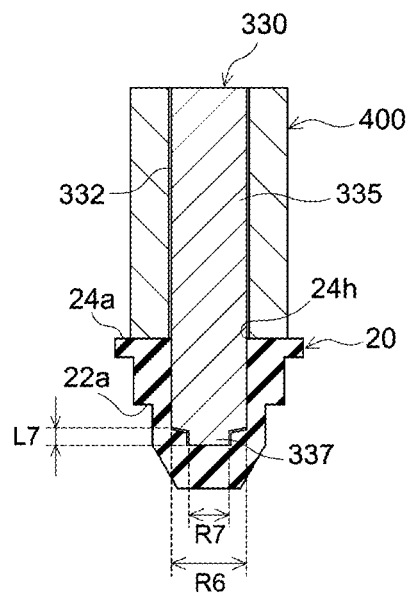
FIG. 13 is a cross-sectional view of a structure of a temporary sealing plug according to Test Example 3.

As an insertion pin of Example 3, an insertion pin 330 having a structure shown in FIG. 13 was provided. The insertion pin 330 had a large-diameter portion 335 and a small-diameter portion 337. The large-diameter portion 335 had a diameter R6 of 2.8 mm. The small-diameter portion 337 had a diameter R7 of 1.6 mm and a length L7 of 0.7 mm. The length L7 is a length of the small-diameter portion 337 in the axial direction. In FIG. 13, the reference numeral 332 indicates the peripheral wall surface of the insertion pin 330.

Figure 14:
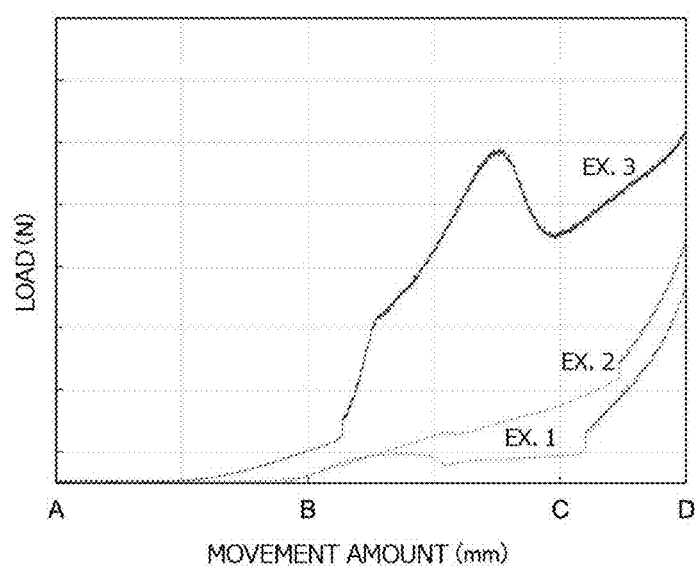
FIG. 14 is a graph showing results of Test Examples.

Each of the insertion pins according to the examples was disposed inside a guide portion 400, which was then inserted into a hole 24 of a temporary sealing plug 20 provided (see FIGS. 2, 3, 12, and 13). The temporary sealing plug with the insertion pin according to each of the examples inserted therein is attached into a liquid injection hole of the battery case by the procedures described in the embodiment. At this time, the load applied to the periphery of the liquid injection hole was measured according to the manual of a measurement device. FIG. 14 shows the results. As the measurement device, Autograph AG50kNX manufactured by Shimadzu Corporation was used.

In the graph shown in FIG. 14, the horizontal axis represents a movement amount (mm) of the insertion pin, and the vertical axis indicates the load (N) applied to the inner wall surface of the liquid injection hole. In the graph, A to D indicate positional relationship between the temporary sealing plug and the liquid injection hole.

A: The state where the position of the end surface 261 of the tapered portion 26 of the temporary sealing plug 20 coincided with the position of the surface Sa of the periphery of the through hole Sh (the liquid injection hole) of the target S (the lid) (see FIG. 5).

B: The state where the sealing portion 25 of the temporary sealing plug 20 has begun to fit into the through hole Sh (the liquid injection hole).

C: The state where the side 22a of the cylinder 22 of the temporary sealing plug 20 was in contact with the surface Sa of the target S (the lid) (see FIG. 6).

D: The state where the insertion pin is pushed further from the state C, and this caused the cylinder 22 to be yielded.

As can be seen from FIG. 14, among the degrees of increase in the load applied to the inner wall surface of the liquid injection hole from the positional relationship in the state A to the positional relationship in the state C in the case where the temporary sealing plug was attached to the liquid injection hole by using the insertion pins of Examples, the degree of the increase was the smallest in Example 1. In contrast, in Example 2 where a small-diameter portion was not included, pushing in of the insertion pin caused the temporary sealing plug to sag, thereby increasing the degree of increase in the load. Further, in Example 3, it was considered that a sufficient space was not present inside the hole into which the insertion pin had been inserted, so that the friction between the insertion pin, the temporary sealing plug, and the inner wall surface of the liquid injection hole was generated during fitting in of the temporary sealing plug, thereby further increasing the degree of the increase.

Although specific examples of the technology disclosed herein have been described in detail above, they are mere examples and do not limit the appended claims. The technology disclosed herein encompasses various modifications and changes of the specific examples. For example, in the embodiments, a step 243 is provided inside the hole 24 of the plug 20. However, the technology disclosed herein is not limited thereto as long as exhibiting the effects of the technology disclosed herein. For example, the step 243 may be an inclined portion, or may not be provided.

What is claimed is:

1. A device for attaching into a through hole of a target a cylindrical plug having therein a non-through hole that has an opening on one end surface, the device comprising:
   an insertion pin configured to be inserted into the non-through hole from the opening of the cylindrical plug; and
   a guide portion configured to guide a peripheral wall surface of the insertion pin, the guide portion being slidable in an axial direction of the insertion pin, wherein
   the device is configured to:
      when the cylindrical plug is disposed inside the through hole, cause the insertion pin to be pushed into the non-through hole with the guide portion in contact with a periphery of the opening, to attach the cylindrical plug into the through hole, and
      after the attachment of the cylindrical plug into the through hole,
         cause the insertion pin to be moved in an opposite direction to the non-through hole to remove the insertion pin from the non-through hole, and
         detach the guide portion from the opening.

2. The device according to claim 1, wherein
   the insertion pin coaxially comprises
      a first columnar portion, and
      a second columnar portion having a diameter smaller than the first columnar portion,
   the second columnar portion protrudes from an end of the first columnar portion in the axial direction,
   the first columnar portion is slidable in the axial direction along an inner wall surface of the non-through hole, and
   the device is configured to attach the cylindrical plug into the through hole with
      (i) at least a part of the first columnar portion and the second columnar portion inserted into the non-through hole, and
      (ii) an end of the second columnar portion in an insertion direction of the insertion pin in contact with at least a part of a bottom surface of the non-through hole.

3. The device according to claim 1, wherein
   the cylindrical plug comprises:
      a plug body configured to be fitted into the through hole of the target, and
      a restriction portion configured to restrict fitting of the cylindrical plug into the through hole,
   the plug body and the restriction portion are continuous to each other,
   the opening of the non-through hole is formed on the one end surface of the cylindrical plug on a side with the restriction portion in a direction in which the plug body and the restriction portion are continuous to each other,
   the non-through hole extends from the opening to the inside of the plug body through the restriction portion, and
   the bottom surface of the non-through hole is formed inside the plug body.

4. A method for manufacturing a secondary battery comprising an electrode assembly that comprises a positive electrode and a negative electrode, a nonaqueous electrolyte, and a battery case comprising a liquid injection hole for injecting the nonaqueous electrolyte, the battery case housing the electrode assembly and the nonaqueous electrolyte, the method comprising:
   temporary sealing, by using a device, the liquid injection hole of the battery case housing the electrode assembly and the nonaqueous electrolyte with a cylindrical plug having therein a non-through hole that has an opening on one end surface, wherein
   the device comprises:
      an insertion pin configured to be inserted into the non-through hole from the opening of the cylindrical plug; and
      a guide portion configured to guide a peripheral wall surface of the insertion pin, the guide portion being slidable in an axial direction of the insertion pin, and
   the temporary sealing comprises:
      when the cylindrical plug is disposed inside the liquid injection hole, causing the insertion pin to be pushed into the non-through hole with the guide portion in contact with a periphery of the opening, to attach the cylindrical plug into the liquid injection hole, and
      after the attachment of the cylindrical plug,
         causing the insertion pin to be moved in an opposite direction to the non-through hole to remove the insertion pin from the non-through hole, and
         detaching the guide portion from the opening.

5. The method according to claim 4, wherein
   the temporary sealing comprises:
      disposing the insertion pin inside the guide portion,
      inserting the insertion pin into the non-through hole from the opening of the cylindrical plug after the disposing,
      bringing the guide portion in contact with the periphery of the opening,
      after the bringing of the guide portion, aligning a position of another end surface of the cylindrical plug opposite to the one end surface having the opening with a periphery of the liquid injection hole of the battery case, after the aligning of the position, fitting the cylindrical plug into the liquid injection hole by sliding the insertion pin and pushing the cylindrical plug into the non-through hole with the guide portion in contact with the periphery of the opening, and after the fitting of the cylindrical plug, removing the insertion pin from the non-through hole by moving the insertion pin in the opposite direction to the non-through hole, with the guide portion in contact with the periphery of the opening.

6. The method according to claim 5, wherein
the cylindrical plug comprises
a plug body configured to be fitted into the liquid injection hole of the battery case, and
a restriction portion configured to restrict fitting of the cylindrical plug into the liquid injection hole, the restriction portion comprising a flange portion and a cylinder, wherein a diameter of the flange portion is larger than a diameter of the cylinder,
the flange portion and the cylinder are continuous to each other in an axial direction of the cylindrical plug,
the plug body and the restriction portion are continuous to each other,
the opening of the non-through hole is formed in an outer surface of the cylindrical plug on a side with the restriction portion in a direction in which the plug body and the restriction portion are continuous to each other,
the non-through hole extends from the opening to the inside of the plug body through the restriction portion, and
the bottom surface of the non-through hole is formed inside the plug body.

7. The device according to claim 1, wherein
the device is configured to, when the insertion pin is moved in the opposite direction to the non-through hole to remove the insertion pin from the non-through hole,
cause a part of the guide portion to be in contact with the periphery of the opening, and
cause the guide portion to push the periphery of the opening at the part of the guide portion.

8. The device according to claim 1, wherein
the cylindrical plug comprises
a plug body configured to be fitted into the through hole of the target, and
a restriction portion configured to restrict fitting of the cylindrical plug into the through hole, the restriction portion comprising a flange portion and a cylinder, wherein a diameter of the flange portion is larger than a diameter of the cylinder,
the flange portion and the cylinder are continuous to each other in an axial direction of the cylindrical plug,
the plug body and the restriction portion are continuous to each other,
the opening of the non-through hole is formed in an outer surface of the cylindrical plug on a side with the restriction portion in a direction in which the plug body and the restriction portion are continuous to each other,
the non-through hole extends from the opening to the inside of the plug body through the restriction portion, and
the bottom surface of the non-through hole is formed inside the plug body.

9. The device according to claim 1, wherein
the guide portion is cylindrical and separable from the cylindrical plug.

10. The device according to claim 8, wherein
the guide portion is cylindrical and separable from the plug body.

11. A device for attaching, into a through hole of a target, a cylindrical plug having therein a non-through hole that has an opening on one end surface, the device comprising:
an insertion pin configured to be inserted into the non-through hole from the opening of the cylindrical plug; and
a guide portion configured to guide a peripheral wall surface of the insertion pin, the guide portion being (i) slidable in an axial direction of the insertion pin, (ii) cylindrical, and (iii) separable from the cylindrical plug, wherein
the device is configured to:
when the cylindrical plug is disposed inside the through hole, cause the insertion pin to be pushed into the non-through hole with the guide portion disposed on a periphery of the opening, to attach the cylindrical plug into the through hole, and
after the attachment of the cylindrical plug,
cause the insertion pin to be moved in an opposite direction to the non-through hole to remove the insertion pin from the non-through hole, and
detach the guide portion from the opening,
the cylindrical plug comprises
a plug body configured to be fitted into the through hole of the target, and
a restriction portion configured to restrict fitting of the cylindrical plug into the through hole, the restriction portion comprising a flange portion and a cylinder, wherein a diameter of the flange portion is larger than a diameter of the cylinder,
the flange portion and the cylinder are continuous to each other in an axial direction of the cylindrical plug,
the plug body and the restriction portion are continuous to each other,
the opening of the non-through hole is formed in an outer surface of the cylindrical plug on a side with the restriction portion in a direction in which the plug body and the restriction portion are continuous to each other,
the non-through hole extends from the opening to the inside of the plug body through the restriction portion, and
the bottom surface of the non-through hole is formed inside the plug body.

12. The device according to claim 11, wherein
the insertion pin coaxially comprises
a first columnar portion, and
a second columnar portion having a diameter smaller than the first columnar portion,
the second columnar portion protrudes from an end of the first columnar portion in the axial direction of the insertion pin,
the first columnar portion is slidable in the axial direction of the insertion pin along an inner wall surface of the non-through hole, and
the device is configured to attach the cylindrical plug into the through hole with
(i) at least a part of the first columnar portion and the second columnar portion inserted into the non-through hole, and
(ii) an end of the second columnar portion in an insertion direction of the insertion pin in contact with at least a part of a bottom surface of the non-through hole.

13. The device according to claim 1, wherein
the guide portion includes a hole extending from one end to another end of the guide portion, and
the guide portion is configured to
receive the insertion pin from said one end through the hole, and
abut the cylindrical plug at the periphery of the opening with said another end.

14. The method according to claim 4, wherein
the guide portion includes a hole extending from one end to another end of the guide portion, and
the temporary sealing comprises:
receiving the insertion pin from said one end of the guide portion through the hole, and
abutting the cylindrical plug at the periphery of the opening with said another end of the guide portion.

15. The device according to claim 11, wherein
the guide portion includes a hole extending from one end to another end of the guide portion, and
the guide portion is configured to
receive the insertion pin from said one end through the hole, and
abut the cylindrical plug at the periphery of the opening with said another end.

\* \* \* \* \*